United States Patent
Reul et al.

(10) Patent No.: US 6,883,658 B2
(45) Date of Patent: Apr. 26, 2005

(54) DEVICE FOR OPTIONAL ENGAGING AND DISENGAGING OF A FRICTION CLUTCH FOR MOTOR VEHICLES

(75) Inventors: Alexander Reul, Frensdorf (DE); Steffen Wöhner, Gefell (DE); Geza Zsari, Ebern (DE)

(73) Assignee: FTE Automotive GmbH & Co. (DE)

( * ) Notice: Subject to any disclaimer, the term of this patent is extended or adjusted under 35 U.S.C. 154(b) by 6 days.

(21) Appl. No.: 10/444,108

(22) Filed: May 22, 2003

(65) Prior Publication Data

US 2004/0040816 A1 Mar. 4, 2004

(30) Foreign Application Priority Data

May 23, 2002 (DE) ........................................ 102 22 730

(51) Int. Cl.$^7$ ............................................. F16D 25/08
(52) U.S. Cl. ................ 192/98; 192/30 W; 192/85 CA; 192/91 A
(58) Field of Search ......................... 192/85 CA, 91 A, 192/30 W, 98; 340/454; 73/161, 774

(56) References Cited

U.S. PATENT DOCUMENTS

| | | | | |
|---|---|---|---|---|
| 4,340,133 A | * | 7/1982 | Blersch .................... | 192/30 W |
| 6,085,885 A | * | 7/2000 | Herzig et al. ............ | 192/85 CA |
| 6,098,774 A | | 8/2000 | Herzig et al. | |
| 6,688,445 B1 | * | 2/2004 | Otto ....................... | 192/85 CA |
| 2001/0030097 A1 | | 10/2001 | Konrad et al. | |
| 2003/0029692 A1 | | 2/2003 | Rogner et al. | |

FOREIGN PATENT DOCUMENTS

| | | |
|---|---|---|
| DE | 41 20 643 A1 | 12/1992 |
| DE | 197 31 842 A1 | 1/1998 |
| DE | 197 16 473 A1 | 10/1998 |
| DE | 100 39 242 A1 | 3/2001 |
| DE | 100 51 374 A1 | 4/2002 |
| DE | 101 02 300 A1 | 7/2002 |
| GB | 2 256 907 A | 12/1992 |
| GB | 2 315 526 | 2/1998 |
| JP | 2002340019 | 11/2002 |
| WO | WO 98/27351 | 6/1998 |

* cited by examiner

*Primary Examiner*—Saul Rodriguez
(74) *Attorney, Agent, or Firm*—McAndrews, Held & Malloy, Ltd.

(57) ABSTRACT

A device is disclosed for the optional engaging and disengaging of a friction clutch for motor vehicles with a preferably hydraulic actuating mechanism, such as a central disengaging device, which, in order to apply an actuating force, is operatively connected with the friction clutch via at least one actuating force transmission member, such as a release bearing, which is pre-stressed in the disengaging direction by means of a spring. The device also has a sensor device with a sensor for sensing a variable representative of the engaging respectively disengaging state of and/or the state of wear on the friction clutch. According to the invention, the force of the spring for pre-stressing the actuating force transmission member or of a spring arranged in parallel with it can be sensed using the sensor, as a variable representative of the disengaging and engaging state of and/or the state of wear on the friction clutch. As a result, a device is created in which a variable representative of the disengaging respectively engaging state of and/or the state of wear on the friction clutch can be sensed in a particularly simple manner.

32 Claims, 4 Drawing Sheets

DEVICE FOR OPTIONAL ENGAGING AND DISENGAGING OF A FRICTION CLUTCH FOR MOTOR VEHICLES

FIELD OF THE INVENTION

This invention relates to a device for the optional disengagement and engagement of a friction clutch for motor vehicles. The invention relates in particular to a central disengaging device of a hydraulic clutch control as used extensively in the automobile industry.

BACKGROUND OF THE INVENTION

A conventional hydraulic clutch control for a motor vehicle friction clutch has a master cylinder connected with a compensating container filled with hydraulic fluid, which master cylinder can be actuated via a clutch pedal or an electric motor drive. The master cylinder is hydraulically connected with a slave cylinder via compressed-air piping, so that by depressing the clutch pedal or causing displacement of the master cylinder by electric motor, pressure generated in the master cylinder can be transmitted via the head of fluid in the compressed-air piping to the slave cylinder. As a result, the release bearing of the friction clutch is subjected to an actuating force via the slave cylinder piston in order to separate the clutch pressure plate from a clutch carrier plate via a releasing device and so to separate the engine from the motor vehicle gears. Hydraulic clutch controls are also known, the releasing device of the friction clutch being capable of being actuated with an operating or slave cylinder operatively connected to them, which in turn is controlled via a hydraulic servo circuit.

In order to guarantee the most evenly possible actuation of the friction clutch with low space requirement for the operating or slave cylinder, the state of the art has also suggested that the slave cylinder be formed as an annular cylinder arranged around the clutch or gear shaft and secured to the gears. In the annular cylinder an annular piston is arranged to slide in an axial direction of the clutch or gear shaft which is operatively connected with the release bearing of the friction clutch. When the annular cylinder impacts hydraulically via the compressed-air piping the annular piston acts via the release bearing on the releasing device of the friction clutch in order to disengage this. Such slave cylinders are also known as central disengaging or releasing devices due to their arrangement concentric to the clutch or gear shaft.

With such hydraulic clutch controls, providing sensor devices on the clutch actuation side is already known, in other words without intervention at the actual components of the friction clutch being necessary, in order to sense indirectly the position of the clutch pressure plate. Such sensing permits on the one hand a statement to be made as to the state of wear on the friction clutch. On the other hand, the disengagement respectively engagement state of the friction clutch can be determined, so that, for example, in the case of automated friction clutches, the clutch actuation can be controlled automatically to the desired extent which, for example, permits a reduction in clutch switching times. Finally, the results of sensing can also be used for safety measures during operation of the motor vehicle, for example, so that the motor vehicle can only be started once the clutch pedal is depressed.

DESCRIPTION OF THE PRIOR ART

In this connection the generic DE-A-41 20 643 discloses a device for the operational disengaging respectively engaging of a friction clutch for motor vehicles with a hydraulic actuating mechanism in the form of a conventional slave cylinder or a central disengaging device. This slave cylinder or central disengaging device is operatively connected with the friction clutch via at least one actuating force transmission member in the form of a release bearing to apply an actuating force. In the release direction the release bearing is pre-stressed via an pre-load spring provided in the pressure chamber of the conventional slave cylinder or, in the case of a central disengaging device, between the central disengaging device housing and the release bearing. The pre-load spring, the force of which is considerably less than the force of the actual clutch spring, ensures permanently light abutting of the release bearing at the other release components of the friction clutch, so that, on the one hand, there is no play between the actuating force transmission members and release components—in the case of a conventional slave cylinder, therefore, between piston, setbolts, clutch release fork lever, release bearing and clutch pressure plate or in the case of a central disengaging device between release bearing and clutch pressure plate. On the other hand, the release bearing rotates constantly as well due to the pre-stressing applied by the pre-load spring, which greatly reduces the wear of the release bearing compared to a construction with the release bearing accelerated and decelerated during the disengaging and engaging process respectively. With a disengaging movement of the release bearing the pre-load spring is relieved, and loaded in contrast during an engaging movement.

Finally, a sensor device is provided according to this state of the art, which has a displacement sensor on the slave cylinder or central disengaging device. Here, the displacement sensor in a simple embodiment only serves to render the state of wear on the friction clutch visible via a display once the wear limit of the friction linings on the clutch disk is reached. To do this, the displacement sensor is constructed as a resistor element in the case of a conventional slave cylinder, this element being destroyed during a wear-induced rearward movement of the piston rod by an edge on the piston rod and thus senses the reaching of the wear limit. Alternatively, a switch placed in the housing of a conventional slave cylinder is suggested, which switch reaches into the pressure chamber radially from the outside and is actuated by the outer contour of the piston with a corresponding state of wear on the friction linings. Other alternatives provide, for example, for the arrangement of contact pins in the wall of the slave cylinder housing facing the piston, and which are connected electrically with each other in the event of corresponding wear on the friction linings by, for example, the electrically conducting front wall of the piston, or the arrangement of a hydraulic pressure switch on the slave cylinder housing by means of which the hydraulic pressure in the pressure chamber can be sensed. With the latter alternative, a return valve arrangement connected hydraulically with the pressure chamber is also provided which can be mechanically actuated by means of a tappet fitted to the piston, in order to reduce the pressure in the pressure chamber to zero in the event of corresponding wear on the friction linings.

Furthermore, the displacement sensor according to this state of the art serves, in a more complex embodiment, to also sense the position of the release system and therefore the engaging position of the clutch in addition to the state of wear on the friction clutch, in order to permit automatic clutch actuation. Here, the relative movement between the piston and the cylinder housing is sensed using a sensor arrangement which has a resistance which changes according to the relative movement or an accordingly changeable capacity or inductivity. Common to these alternatives is a two-component formation of the sensor arrangement with one fixed component on the cylinder housing side and one piston-side part which moves relative to the fixed part.

Although with this state of the art the sensor devices are provided advantageously on the clutch actuation side, i.e. without the necessity for intervention in the actual friction clutch components, a disadvantage of this state of the art is that the integration of the respective displacement-measuring device in the slave cylinder as well as in the central disengaging device is relatively expensive.

The task of the invention is therefore to create a device for the optional disengagement and engagement of a friction clutch for motor vehicles, the variable representative of the disengagement and engagement state and or the wear state of the friction clutch being capable of being sensed simply.

SUMMARY OF THE INVENTION

According to the present invention, there is provided a device for the optional disengaging and engaging, respectively, of a friction clutch for motor vehicles, with an actuating mechanism, the clutch having an engaging state and a disengaging direction and the actuating mechanism being operatively connected with the friction clutch via at least one actuating force transmission member for applying an actuating force, the actuating force transmission member being pre-stressed in the disengaging direction by means of a spring, and there being a sensor device for sensing a variable representative of at least one of the group consisting of the disengaging and engaging state, respectively, of the friction clutch and of the state of wear on the friction clutch with a sensor; wherein by means of the sensor the force of a spring selected from the group consisting of the spring for pre-stressing the actuating force transmission member and a spring arranged in parallel with the spring for pre-stressing the actuating force transmitting member can be sensed as the variable representative of at least one of the group consisting of the disengaging and engaging state, respectively, of the friction clutch and of the state of wear on the friction clutch.

In an initial alternative the invention uses in advantageous manner the fact that the actuating force transmission member is pre-stressed on the grounds mentioned at the start of the description by means of a spring, the characteristics of which are known. Each force of this spring is assigned a certain spring excursion so that via the elastic force sensed respectively by means of the sensor information about the elastic excursion and therefore indirectly about the position of the actuating force transmission member can be obtained. The engaging and disengaging state of the friction clutch then results from the position of the actuating force transmission member. The position of the actuating force transmission member also alters in the unactuated state of the friction clutch depending on the wear on the friction clutch friction linings—the actuating force transmission member travels with increasing clutch wear in the opposite direction to the actuation direction and the pre-stressing of the spring increases accordingly—so that information can also be obtained about the state of wear on the friction clutch via the sensed initial stressing force of the spring. As a result, it is possible in a simple fashion and with the least design expenditure and, in contrast to the state of the art described at the start of the text, improved economy to determine the disengaging and engaging travel of the friction clutch as well as the wear on its lining. The costly, two-component formation of the sensor device, which requires a lot of space and is suggested in the generic state of the art, with a housing-side component and a piston-side component can be dispensed with.

In a second alternative according to the invention the force of a spring arranged in parallel with the spring for pre-stressing the actuating force transmission member can be sensed using the sensor as the variable representative of the disengaging and engaging state of and/or the state of wear on the friction clutch. Also with this parallel spring whose characteristics are known a certain spring excursion is assigned to each elastic force, so that, here also, information can be obtained about the spring excursion and therefore indirectly about the position of the actuating force transmission member via the elastic force sensed respectively using the sensor, and from which the engaging and disengaging state of the friction clutch and/or its state of wear is ascertained. One advantage of this alternative is that the spring connected in parallel can be dimensioned smaller and/or more finely than the spring for pre-stressing the actuating force transmission member. Smaller springs have narrower manufacturing respectively force tolerances as well as smaller internal friction losses and tend to an essentially lesser degree to seat under load, in other words to have a spring constant which changes over time, so that undesirable load variations at the sensor can be largely avoided. As a result, and in contrast to the first alternative, the second alternative permits with only limited additional structural expenditure the use of springs for pre-stressing the actuating force transmission member which need not be expensively pre-sorted in relation to the manufacturing and/or force tolerances which can be really wide here. Furthermore, no, respectively only limited, compensating expenditure in the evaluation electronics of the sensor device is required for undesired load variations.

The sensor may preferably be an electric pressure sensor which can be connected simply with an appropriate evaluation circuit of the motor vehicle electronics. In this way carbon disks for example can be used as electric pressure sensors which are superposed one on top of the other to form a column abutted by the spring for pre-stressing the actuating force transmission member or the spring arranged in parallel with it. The transfer resistance of these disks depends very much on the pressure with which they were pressed together, so that the pressure measurement is converted to a resistance measurement. However, it is preferable for the electrical pressure sensor to have a piezoelectric element. Such a piezoelectric element has a plurality of quartz disks which, under compressive load, create charges on the quartz surface which are directly proportional to the pressure and can be tapped simply. One advantage of the use of a piezoelectric element is that the piezoelectric element reacts quickly even when pressure fluctuations are rapid, which can occur here if the operating speed of the friction clutch is high. The use of a piezoelectric element also has the advantage in that it is a passive element which does not require any electrical power supply from the outside. Finally, piezoelectric elements as mass-produced articles are cheaply available and can be manufactured cheaply.

The sensor is usefully arranged with the spring for pre-stressing the actuating force transmission member or the spring arranged in parallel with it in series respectively, so that no additional radial assembly room is required. No additional axial assembly room is required for this either, as the spring, under only a slight increase in the pre-stressing force, can deflect by the thickness dimension of the sensor.

The sensor may be arranged on the side of the spring for pre-stressing the actuating force transmission member or the spring arranged in parallel with it, which side faces away from the actuating force transmission member. Such an arrangement of the sensor has the advantage in that oscillations induced by the combustion engine of the motor vehicle in particular, which can be transmitted from the friction clutch via the actuating force transmission member, can be largely damped by the characteristics of the spring and therefore cannot act undamped on the sensor. This results in largely undisturbed respectively clear sensor signals which can be evaluated more simply.

The sensor device according to the invention can be used as a matter of course at any clutch control for motor vehicles, where an actuating mechanism—which needs not necessarily operate hydraulically—is operatively connected to the friction clutch by means of an actuating force transmission member pre-stressed in the disengaging direction by a spring, in order to apply an actuating force. For example, the sensor device according to the invention can, connected in series with a pre-load spring, be integrated in the pressure compartment of a conventional slave cylinder of a hydraulic clutch control. An especially preferred location of application for the sensor device according to the invention is where the actuating mechanism is a central disengaging device for a hydraulic clutch control which, for applying an actuating force, is operatively connected with the friction clutch via a release bearing acting as an actuating force transmission member and being pre-stressed in the disengaging direction by means of a pre-load spring. In the case of a central disengaging device of a hydraulic clutch control the sensor device according to the invention can be simply fitted respectively integrated or even retro-fitted or integrated subsequently, without the need for interventions at the hydraulic components to do this.

The pre-load spring may be designed as a compression spring, preferably a coil compression spring, supported by its one end at the release bearing and by its other end at a housing of the central disengaging device, wherein the sensor is arranged in a flux of force between the pre-load spring and the housing of the central disengaging device, so that the advantages already discussed above in relation to the arrangement of the sensor emerge inter alia.

A spring plate may be provided at the housing-side end of the pre-load spring, via which the pre-load spring is supported at the housing of the central disengaging device, wherein the sensor is arranged at (or in) the spring plate. This means that the use of the standard component spring plate is expanded advantageously, which spring plate already serves in the state of the art—see, for example, DE-A-197 16 473 of the applicant—as a receptacle for a protective bellow provided at the central disengaging device if need be and/or the anti-twist locking of the pre-load spring. The spring plate may have, usefully, an attaching or fixing section in which the sensor and, preferably, also evaluation electronics are received for the sensor. These parts of the sensor device therefore only require a connection to the motor vehicle electronics via a simple cable connection.

The spring plate may, with the aid of three bearing or supporting sections, abut a plane surface of the housing of the central disengaging device in statically determined fashion, wherein the sensor has an operating or actuating section which forms one of the three supporting sections. The statically determined abutting of the supporting sections at the plane surface of the housing of the central disengaging device promotes a defined pressing of the sensor and therefore the obtaining of clear sensor signals. The same applies to an alternative construction of the device with the pre-load spring being supported at three points at a plane surface of the housing of the central disengaging device for which an operating or actuating section of the sensor placed on the housing-side end of the pre-load spring forms a bearing or supporting section, whilst two further supporting sections are formed by deflections of the last housing-side turn of the pre-load spring, which deflections are advantageously and simply created and extend in a direction towards the plane surface, or two supporting parts placed on top of the last housing-side turn of the pre-load spring.

One further alternative of the sensor connection is where the housing of the central disengaging device has a hole in which the sensor is arranged, wherein a final section of the pre-load spring extending in a direction towards the hole engages in the hole and operatively abuts the sensor. With this construction of the device the hole serves advantageously to both receive the sensor and the anti-twist locking of the pre-load spring.

Finally, the spring arranged in parallel with the spring for pre-stressing the actuating force transmission member can be a pressure spring as a matter of principle. However, the spring arranged in parallel with the spring for pre-stressing the actuating force transmission member is a tension spring, although such a tension spring with its lesser elastic force in relation to the pre-load spring acts against the elastic force of the pre-load spring. However, guide measures are dispensable at a tension spring for this to happen, which guide measures would have to be provided for a pressure spring in order to prevent lateral deflection and which might lead to undesired friction losses.

BRIEF DESCRIPTION OF THE DRAWINGS

The invention is described in more detail in the following on the basis of preferred embodiments with reference to the attached and partially schematic drawings. The drawings show the following.

DESCRIPTION OF THE PREFERRED EMBODIMENTS

Figures 1, 2:
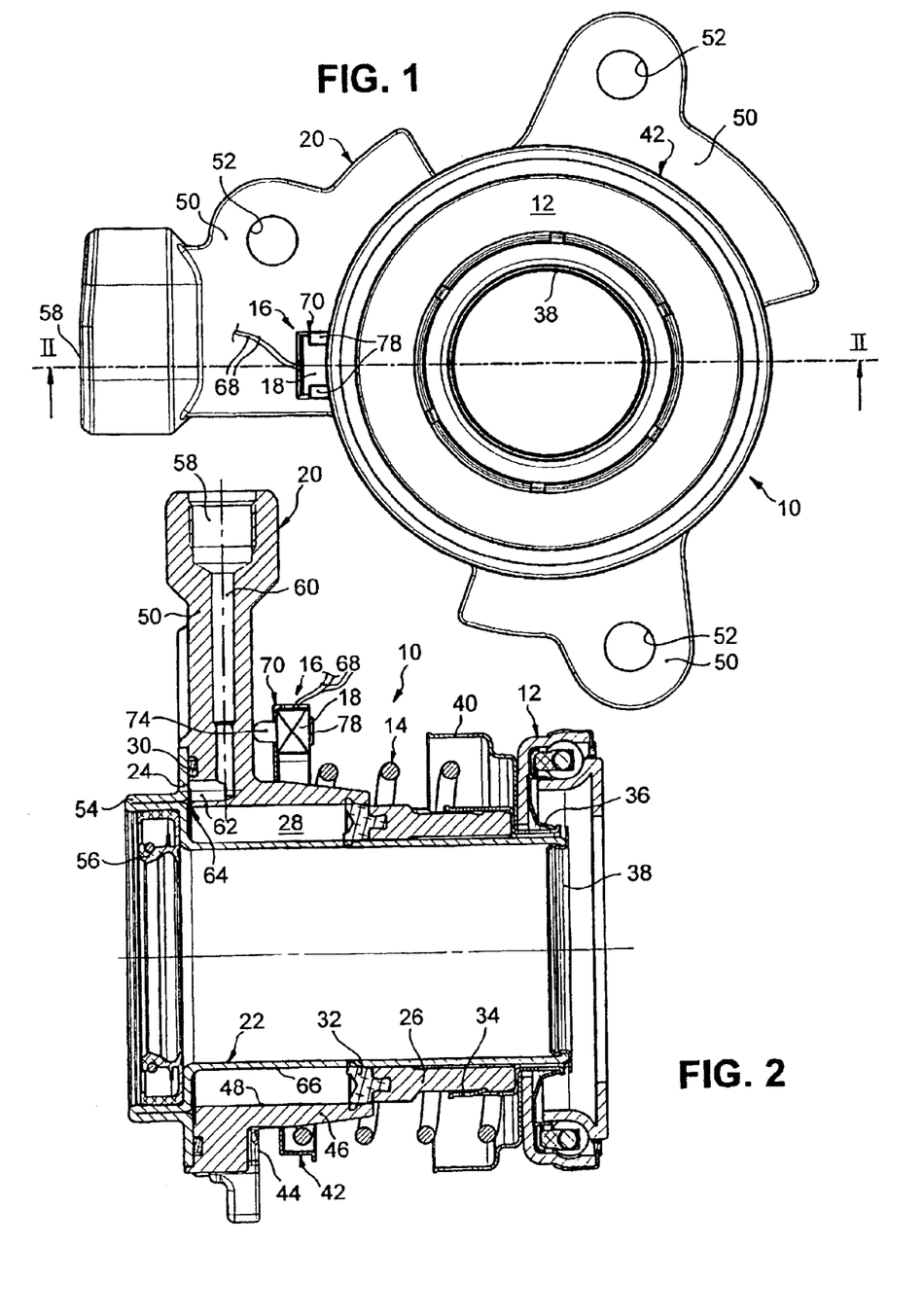
FIG. 1 is a plan view of a central disengaging device of a hydraulic clutch control as an example of a hydraulic actuating device of a device for the optional disengaging respectively engaging of a friction clutch for motor vehicles with a sensor device according to invention, the sensor of the sensor device operating in conjunction with an pre-load spring.
FIG. 2 is a sectional view rotated 90° in the clockwise direction in the drawing plane of the central disengaging device in accordance with FIG. 1 according to the sectional line II—II in FIG. 1.
Figures 8, 9, 10:
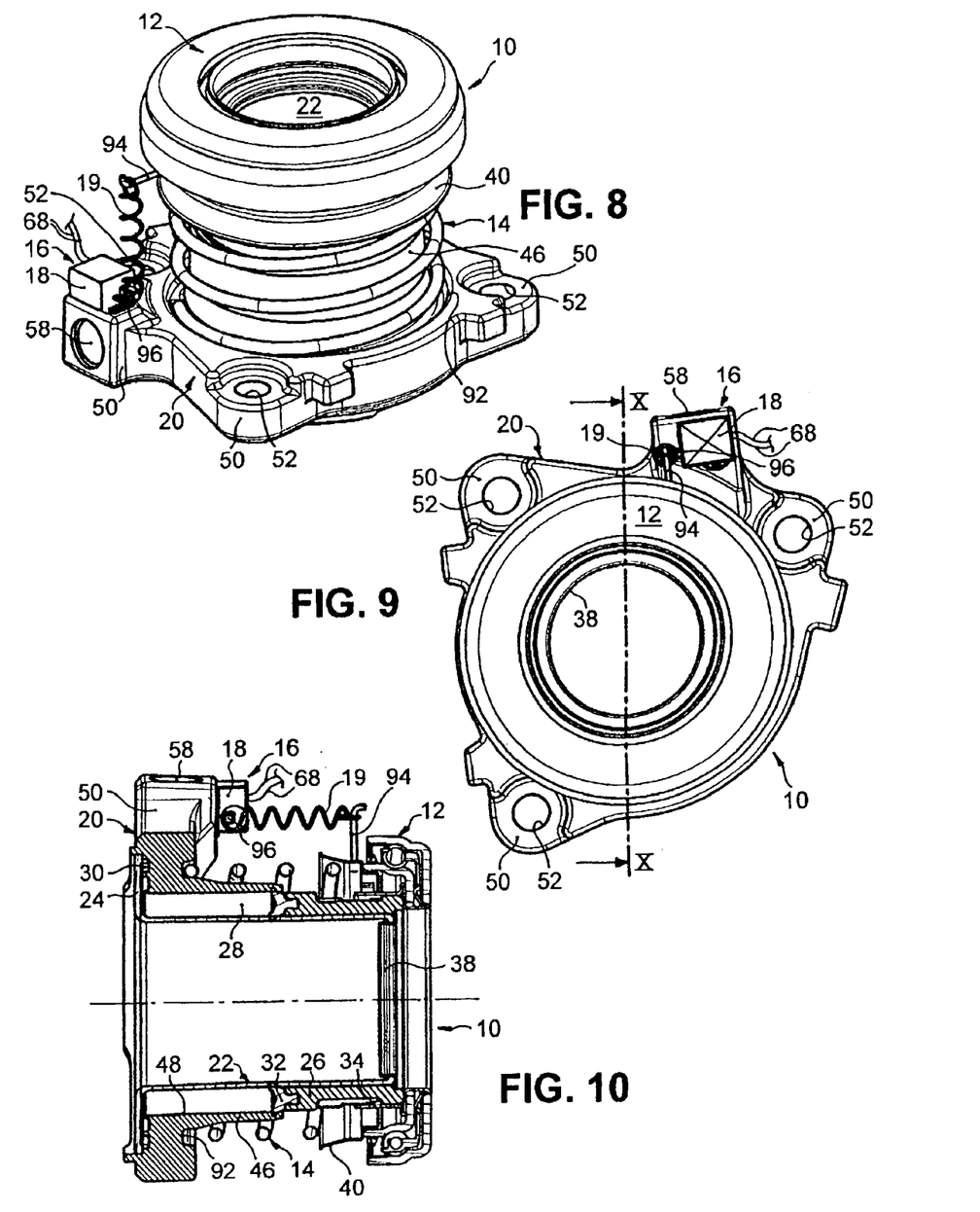
FIG. 8 is a perspective representation of another central disengaging device of a hydraulic clutch control as a further example of a hydraulic actuating mechanism of a device for the optional disengaging respectively engaging of a friction clutch for motor vehicles with a sensor device according to the invention represented more schematically and whose sensor operates in conjunction with a spring connected in parallel with the pre-load spring.
FIG. 9 is a plan view of the central disengaging device according to FIG. 8.
FIG. 10 is a sectional view of the central disengaging device according to FIG. 8 along the sectional line X—X in FIG. 9.

FIGS. 1 and 2 and 8 to 10 show a central disengaging device 10 as an actuating mechanism of a hydraulic clutch control for dry friction clutches in the unfitted state in the original position. At the right-hand end of the central disengaging device 10 in FIG. 2 and 10 is arranged a known release bearing 12 in the form of an actuating force transmission member, via which the central disengaging device 10 is operatively connected with the dry friction clutch (not shown) for applying an actuating force in known fashion. The release bearing 12 is pre-stressed in defined fashion by means of a pre-load spring 14, in the embodiments shown, a coil compression spring in the disengaging direction, i.e. to the right in FIGS. 2 and 10.

Furthermore, a sensor device 16 described in more detail in the following is provided with a sensor 18 represented only schematically and which serves to capture a variable representative of the disengaging respectively engaging state of and the state of wear on the dry friction clutch. What is significant is that, using the sensor 18, the force of the pre-load spring 14 for pre-stressing the release bearing 12 (FIGS. 1 to 7) or of a spring 19 arranged in parallel with it (FIGS. 8 to 10) can be sensed as the variable representative of the disengaging respectively engaging state of and the state of wear on the dry friction clutch.

The central disengaging device 10 has a metal housing 20 in the embodiment in accordance with FIGS. 1 and 2, which encompasses concentrically a sleeve 22 preferably drawn from a steel sheet. The sleeve 22 has at its left-hand end in FIG. 2 an annular flange 24 extending in a radial direction and with which the sleeve 22 is centrally secured to the housing 20. A metal annular piston 26 in the example shown is guided in a sliding fashion on the sleeve 22, which piston, together with the housing 20 and the sleeve 22 with its flange 24, delimits variably a circular pressure compartment 28. The pressure compartment 28 is sealed from the environment by means of a static seal provided between the housing 20 and the flange 24 in the form of an O-ring 30 as well as a dynamic seal in the form of an elastomer sealing sleeve 32 which is fitted appropriately to the left-hand end in FIG. 2 of the annular piston 26.

At the right-hand end in FIG. 2 of the annular piston 26 an essentially cylindrical sheet metal component 34 is appropriately fitted. This component bears a release bearing 12 secured using a retaining ring 36, so that this can be moved in an axial, in other words in a horizontal direction in FIG. 2 using the annular piston 26 when pressure acts on the pressure chamber 28, in order to release or engage the dry friction clutch in known fashion. FIG. 2 also shows a sheet metal ring 38 secured to the right-hand end of the sleeve 22, which projects over the sleeve 22 in a radial direction and therefore forms a stop for the sheet metal component 34 and the annular piston 26 which prevents the annular piston 26 with the components connected to it and with the central disengaging device 10 not fitted from being stripped from the sleeve 22.

The pre-load spring 14 is supported at its right-hand end in FIG. 2 via a spring plate 40 inserted between the sheet metal component 34 and the release bearing 12 and deep-drawn from a metal sheet, to which a protective bellows not shown here for the central disengaging device 10 can be secured, at the release bearing 12. At its left-hand end in FIG. 2 the pre-load spring 14 is supported via a further spring plate 42 deep-drawn from a metal sheet in a fashion to be described at an annular plane surface 44 of the housing 20.

It should further be noted in respect of the housing 20 of the central disengaging device 10 shown in FIGS. 1 and 2 that this has an essentially hollow, cylindrical wall section 46, which has a central through-hole 48 with constant diameter and runs at its left-hand end as shown in FIG. 2 into three flange sections 50, which FIG. 1 shows in plan view. Each of the flange sections 50 is provided with a fixing eye, which flange sections in the motor vehicle serve to secure the central disengaging device 10 to a gear wall respectively a gear cover (not shown) using, for example, screws (not shown), which penetrate the fixing eyes 52. When the central disengaging device 10 is fitted the clutch or gear shaft (not shown) extends through the sleeve 22, a shaft sealing ring 56 abutting in a sealing fashion an extension 54 of the flange 24 at the outer circumference of the clutch gear shaft respectively.

The housing 20 of the central disengaging device 10 is finally provided with a hydraulic connection 58, with which a pressure pipe (not shown) leading to a master cylinder (not shown) can be connected. The hydraulic connection 58 is connected with the pressure compartment 28 via a borehole 60 extending radially through the flange section 50 pointing to the left in FIG. 2, an axially-running borehole 60 connecting to this borehole 60 and an annular gap which is provided axially between the wall section 46 of the housing 20 and the flange 24 of the sleeve 22, in order to permit the supply of hydraulic fluid to the pressure compartment 28 by means of which fluid the annular piston 26 can be moved. Here, the outer periphery surface 66 of the sleeve 22 which extends coaxially to the through-hole 48 of the housing 20 across the full length of the through-hole 48 and beyond forms a running and guide surface for the annual piston 26 to which is secured on the pressure compartment-side the sealing sleeve 32 shown in non-deformed state in FIG. 2 for the purpose of simplifying the illustration.

The actual hydraulic operation of the central disengaging device 10 in the state fitted in the motor vehicle is sufficiently known. A description in this respect is therefore dispensed with at this point. However it can be seen, that with a movement of the annular piston 26 subjected where appropriate to pressure and therefore of the release bearing 12 the pre-load spring 14 clamped between the release baring 12 and the plane surface 44 of the housing 20 is pressed together (movement of the annular piston 26 to the left in FIG. 2) and relaxed (movement of the annular piston 26 to the right in FIG. 2). In doing so, the preferably linear force-displacement-characteristic of the pre-load spring 14 changes the force of the pre-load spring 14 force sensed using the sensor 18 of the sensor device 16 accordingly. In other words, it is possible, via the known force-displacement-characteristic of the pre-load spring 14 and knowing the force of the pre-load spring 14, to obtain information about the spring excursion of the pre-load spring 14 and therefore about the stroke of the annular piston 26 respectively the shifting/movement of the release bearing 12. As the release bearing 12 is clamped so that it is free from play using the pre-load spring 14 with the central disengaging device 10 fitted against the other release elements of the dry friction clutch (e.g. membrane spring tongues; not shown), a measurement for the disengaging and engaging travel of the dry friction clutch is therefore also given. The same applies to the state of wear on the dry friction clutch: as the wear on the dry friction clutch friction linings increases, the release bearing 12 travels in the direction of the housing 20 of the central disengaging device 10, i.e. to the left in FIG. 2, the force of the pre-load spring 14 increasing and being capable of being sensed by the sensor 18 of the sensor device 16.

Figure 3:
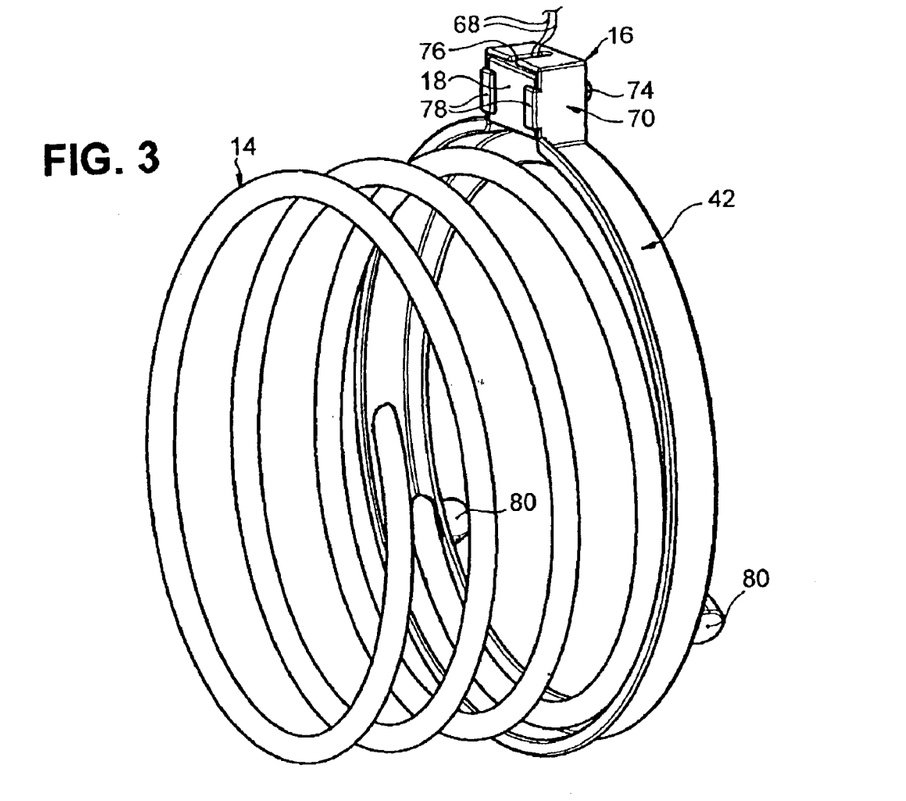
FIG. 3 is an enlarged, perspective representation of the pre-load spring of the central disengaging device shown in FIGS. 1 and 2, with a spring plate fitted to it, at which a sensor according to the invention is provided
Figures 4, 5:
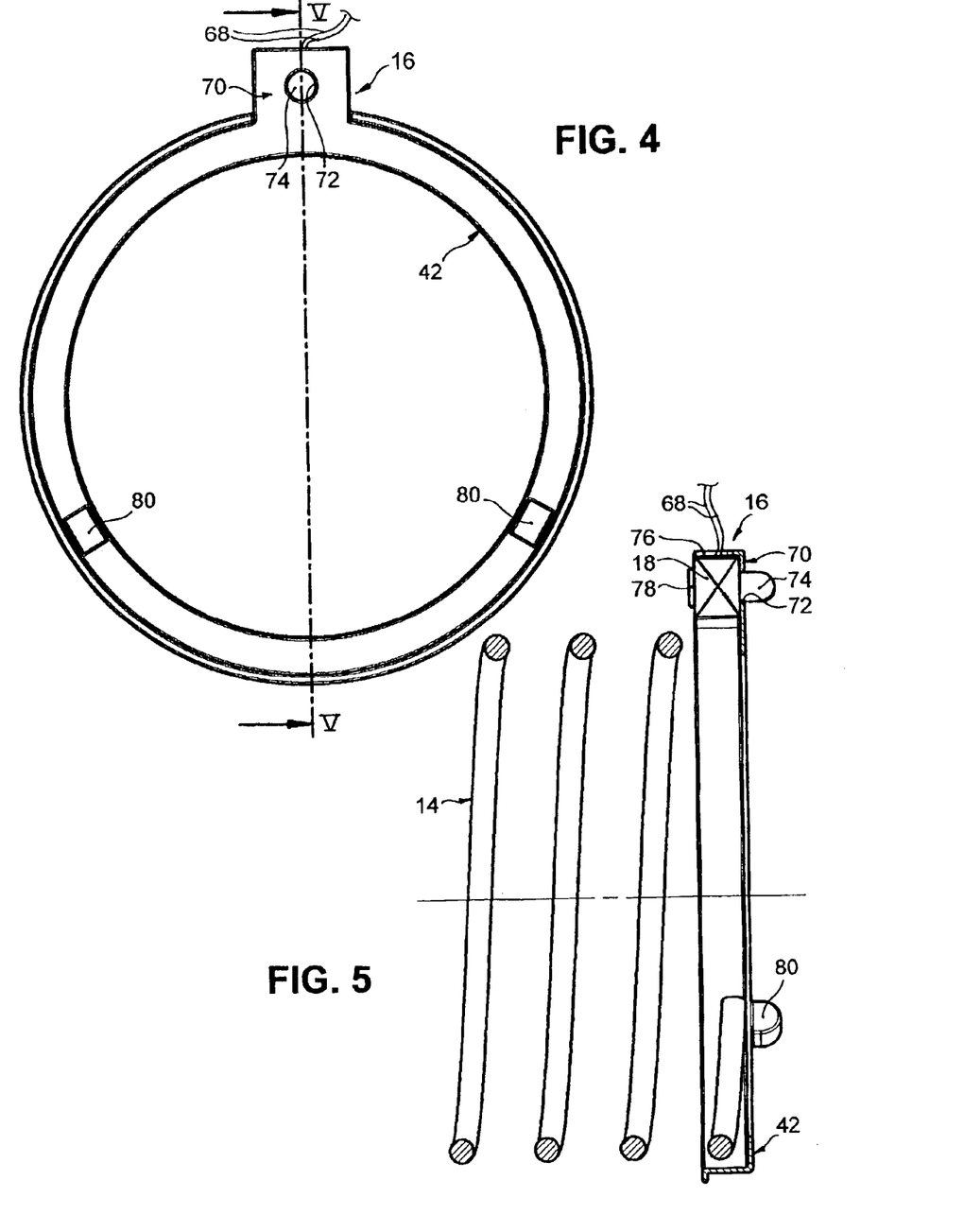
FIG. 4 is a plan view of the spring plate shown in FIG. 3 from the right in FIG. 3.
FIG. 5 is a sectional view of the pre-load spring and of the spring plate according to FIG. 3 along the sectional line V—V in FIG. 4.

FIGS. 3 to 5 show further details of the sensor device 16 of the central disengaging device 10 shown in FIGS. 1 and 2, whose sensor 18 is preferably an electric pressure sensor with a piezoelectric element which supplies under mechanical stressing by the pre-load spring 14 a proportional signal corresponding to the loading state as an electrical voltage which is applied for evaluation purposes via electrical signal leads 68 to the motor vehicle computer (not shown).

In accordance with FIGS. 1, 2, 3 and 5 in particular, the sensor 18 is arranged at the end of the pre-load spring 14 facing the housing 20 of the central disengaging device, in other words, the end facing away from the release baring 12 at the spring plate 42 such that this is located with the pre-load spring 14 in series respectively in a flux of force between the pre-load spring 14 and the housing 20 of the central disengaging device 10. To do this, an essentially box-type fixing section 70 is formed in one-piece with the essentially L-shaped spring plate 42 in profile in accordance with FIG. 5 below, which fixing section projects outwards over the periphery of the spring plate 42 and in which the sensor 18 and, where necessary, evaluation electronics (not shown) for the sensor 18 are received.

As FIGS. 4 and 5 in particular show, the fixing section 70 has on its side facing the plane surface 44 on the housing 20 of the central disengaging device 10 a central opening 72 through which an actuating section 74 of the sensor 18 extends, so that the actuating section 74 projects in a defined fashion from the spring plate 42 in the direction of the plane surface 44. At its radially outward side the fixing section 70, starting from its side facing away from the plane surface 44 at the housing 20 of the central disengaging device 10, is provided with a slot 76 through which the signal leads 68 extended from the sensor 18 outwards. On the side of the fixing section 70 facing away from the plane surface 44 at the housing 20 of the central disengaging device 10 two fixing links 78 are ultimately formed, which, as can be seen particularly clearly in FIG. 3, grip behind the sensor 18 in their deflected state, in order to secure the sensor 18 form-closing in the fixing section 70.

Furthermore, starting from its front side facing the plane surface 44 at the housing 20 of the central disengaging device 10 the spring plate 42 is provided with two sheet metal platings 80, which project in defined fashion from the spring plate 42 like the actuating section 74 of the sensor 18. The actuating section 74 of the sensor 18 and the sheet metal platings 80 therefore form three bearing sections evenly distributed on the periphery of the spring plate 42, by means of which the spring plate abuts in statically determined fashion the plane surface 44 of the housing 20 of the central disengaging device 10. As a result of the release bearing-remote arrangement and three-point support described, the sensor 18 has altogether a clearly-defined, low-vibration bearance fulcrum, which is useful, inter alia, for the clarity of the signals supplied from the sensor 18.

The anti-twist locking of the pre-load spring 14 can be effected in the embodiment shown and using form-closing, known measures not shown here between the annular piston 26 and the housing 20 of the central disengaging device 10 or by known blocking of the pre-load spring 14 acting in the peripheral direction with the housing 20. It is also feasible for the signal leads 68, if appropriately dimensioned and secured, to be able to absorb the forces acting in the peripheral direction at the spring plate 42, so that no further measures are required for anti-twist locking.

Although securing of the sensor 18 in the fixing section 70 using fixing links 78 is shown in the embodiment shown, alternatives to this are feasible. For example, the sensor 18 might also be secured using a snap connection or a glued joint in the fixing section 70 of the spring plate 42. It is also possible, even if not shown in the figures, for the spring plate 42 to be made up of two or more parts, which would facilitate the fitting of the sensor device 16 respectively its retrofitting, as the sensor device 16 respectively the spring plate 42 could be connected radially.

Figures 6, 7:
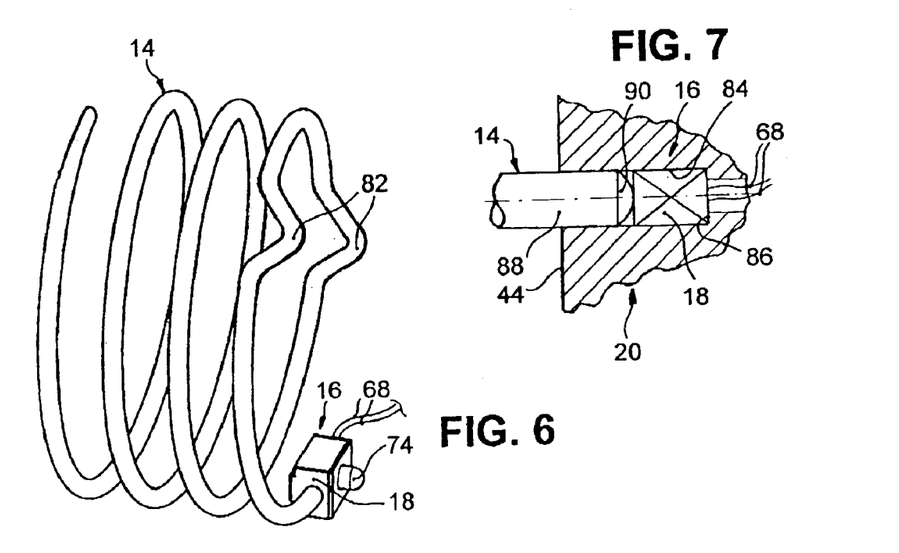
FIG. 6 is a perspective representation of an pre-load spring for a central disengaging device according to a further embodiment with a sensor according to the invention placed on top of it.
FIG. 7 is an interrupted longitudinal sectional view of the housing of a central disengaging device according to a further embodiment, with a borehole in which a sensor according to the invention is arranged and in which a final section of an pre-load spring of the central disengaging device extending in the direction of the borehole engages.

FIG. 6 shows an alternative to the embodiment in accordance with FIGS. 1 to 5. In the case of the embodiment shown in FIG. 6 no spring plate is present via which the pre-load spring 14 would abut the plane surface 44 at the housing 20 of the central disengaging device. Rather, the sensor 18 of radially compact construction is placed directly on the housing-side end of the pre-load spring 14 and secured thereon appropriately, using, for example, adhesive and/or form-closing measures such as latches. Even with this embodiment the actuating section 74 of the sensor 18 forms a bearing section, whilst two further bearing sections are formed by deflections 82 of the last housing-side turn of the pre-load spring 14, these sections extending in the direction of the plane surface 44 at the housing 20 of the central disengaging device 10. This means, that even in this instance, the pre-load springs 14 are supported at three points evenly distributed along the periphery and statically determined at the plane surface 44 of the housing 20 of the central disengaging device 10.

Instead of the deflections 82 at the pre-load spring 14 it would also be feasible for two bearing components to be placed on the last housing-side turn of the pre-load spring 14 at an even angular distance to the sensor 18, and secured there appropriately using adhesive and/or form-closing measures for example, in order to achieve a statically-determined bearing situation.

FIG. 7 illustrates a further alternative to the embodiments described with reference to FIGS. 1 to 5 respectively 6. In the case of the embodiment shown in FIG. 7 and starting from the plane surface 44 a step borehole 84 is let into the housing 20 of the central disengaging device 10, and the sensor 18 arranged in the part of this borehole where its diameter is greater. Here, the sensor 18 abuts a shoulder 86 in the step borehole 84, whilst the signal leads 68 connected with the sensor 18 are fed through the section of the step borehole 84 with the smaller diameter and out as far as the other side of the housing 20 of the central disengaging device 10. Furthermore, the pre-load spring 14 has a final section 88 extending the direction of the step borehole 84 and cropped in this direction which engages in the step borehole 84 and abuts actuation-effectively there with a spherical segment-shaped end 90 the sensor 18. In order to achieve a statically-determined three-point bearance of the pre-load spring 14 at the housing 20 of the central disengaging device 10, the measures described with reference to FIG. 6 (deflections respectively supporting parts) may be used. Furthermore, with this embodiment the sensor 18 is secured particularly easily, the final section 88 of the pre-load spring 14 making advantageously for an anti-twist locking of the pre-load spring 14.

In an alternative to the design according to FIG. 7 instead of the cropped final section 88 of the pre-load spring 14 a projection (not shown) may be provided at the spring plate 42 according to FIGS. 1 to 5, which projection engages in the stepped bore 84 in order to operatively abut the sensor 18. In this design the pre-load spring 14 may be formed as shown in FIGS. 2, 3 and 5.

Finally, FIGS. 8 to 10 show another hydraulic central disengaging device 10 with a sensor device 16, whose sensor 18 operates not in conjunction with the pre-load spring 14, but with a spring 19 arranged in parallel with it, a tension spring in the example shown. The embodiment in accordance with FIGS. 8 to 10 will only be described in the following in as far as it differs from the embodiment in accordance with FIGS. 1 to 5 and in that appears to be necessary for the purpose of comprehending the invention, the parts in the embodiment in accordance with FIGS. 1 to 5 being the same or equivalent parts in FIGS. 8 to 10 with the same reference numerals.

In contrast to the embodiments described previously the housing-side end of the pre-load spring 14 in accordance with FIG. 10 in particular is accepted in a snap ring groove which is let axially into the housing 20 of the central disengaging device 10. The release bearing-side end of the pre-load spring 14, on the other hand, presses via the spring plate 40 against the release bearing 12, an arm 94 extending radially away from the spring plate 40 at the spring plate 40, on which arm the release bearing-side end of the tension spring 19 is affixed. The housing-side end of the tension spring 19 extending parallel to the pre-load spring 14 is secured at a lever 96 of the sensor device 16, which is operatively connected via a deflection device with the piezoelectric element of the sensor 18, so that a pressing force proportional to the tensile force of the spring 19 is applied to the piezoelectric element of the sensor 18. The sensor 18 itself is secured in an appropriate fashion, by means of a screw or clip connection (not shown) for example, to one of the flange sections 50 of the housing 20.

It can be seen that with a movement of the annular piston 26 subjected, where appropriate, to pressure via the hydraulic connection 58 which is connected to the pressure compartment 28, and therefore of the release bearing 12, the tension spring 19 which is stretched between the arm 94 at the spring plate 40 abutting the release bearing 12 as a result of the pre-stressing force of the pre-load spring 14, and the lever 96 of the sensor device 16 relaxes (movement of the annular piston 26 to the left in FIG. 10) respectively is pulled (movement of the annular piston 26 to the right in FIG. 10). In doing so, and in accordance with the preferably linear force-displacement-characteristics of the tension spring 19, the force of the tension spring 19 sensed by the sensor 18 of the sensor device 16 alters. In other words, it is possible by means of the known force-displacement-characteristics of the tension spring 19 arranged in parallel with the pre-load spring 14, and knowing the force of the tension spring 19, to obtain information about the spring excursion of the tension spring 19 and therefore, indirectly, about the stroke of the annular piston 26 and the displacement travel of the release bearing 12, respectively. As, as already mentioned, the release bearing 12 is clamped so that it is free from play against the further release elements of the dry friction clutch by means of the pre-load spring 14 in the fitted state of the central disengaging device 10, a dimension for the disengaging respectively engaging travel of the dry friction clutch is given. As the wear on the dry friction clutch friction linings increases the release bearing 12 travels as already described above in the direction of the housing 20 of the central disengaging device 10, i.e. to the left in FIG. 10, the elastic force of the tension spring 19 decreasing in a manner which can be sensed by the sensor 18 of the sensor device 16. In this way the state of wear on the dry friction clutch can also be determined.

In the case of the embodiment in accordance with FIGS. 8 to 10 only one tension spring 19 is provided. Depending on the respective requirements, however, two or more tension springs may be provided connected in parallel with the pre-load spring 14, which springs are preferably evenly distributed along the periphery of the central disengaging device 10, so that no pull-out torque acts at the release bearing 12.

Although the sensor device according to the invention has been described above on the basis of examples, a central disengaging device actuating a so-called "pressed" dry friction clutch, it is clear to the man skilled in the art that a corresponding sensor for sensing the elastic force of the pre-load spring or of a spring connected in parallel with it can also be used on a so-called "drawn" dry friction clutch.

In summary, a device is proposed for the optional engaging and disengaging of a friction clutch for motor vehicles with a preferably hydraulic actuating mechanism, such as a central disengaging device, which, in order to apply an actuating force, is operatively connected with the friction clutch via at least one actuating force transmission member, such as a release bearing, which is pre-stressed in the disengaging direction by means of a spring. The device also has a sensor device with a sensor for sensing a variable representative of the engaging respectively disengaging state of and/or the state of wear on the friction clutch. According to the invention, the force of the spring for pre-stressing the actuating force transmission member or of a spring arranged in parallel with it can be sensed using the sensor, as a variable representative of the disengaging and engaging state of and/or the state of wear on the friction clutch. As a result, a device is created in which a variable representative of the disengaging respectively engaging state of and/or the state of wear on the friction clutch can be sensed in a particularly simple manner.

We claim:

1. A device for the optional disengaging and engaging, respectively, of a friction clutch for motor vehicles, with an actuating mechanism, the clutch having an engaging state and a disengaging direction and the actuating mechanism being operatively connected with the friction clutch via at least one actuating force transmission member for applying an actuating force, the actuating force transmission member being pre-stressed in the disengaging direction by means of a spring, and there being a sensor device for sensing a variable representative of at least one of the group consisting of the disengaging and engaging state, respectively, of the friction clutch and of the state of wear on the friction clutch with a sensor; wherein by means of the sensor the force of the spring for pre-stressing the actuating force transmission member can be sensed as the variable representative of at least one of the group consisting of the disengaging and engaging state, respectively, of the friction clutch and of the state of wear on the friction clutch; and wherein the sensor is arranged in series with the spring for pre-stressing the actuating force transmission member.

2. A device according to claim 1, wherein the sensor is an electric pressure sensor.

3. A device according to claim 2, wherein the electric pressure sensor has a piezoelectric element.

4. A device according to claim 1, wherein the sensor is arranged on a side of the spring for pre-stressing the actuating force transmission member, which side faces away from the actuating force transmission member.

5. A device according to claim 1, wherein the actuating mechanism is a slave cylinder of a hydraulic clutch control, which, for applying an actuating force, is operatively connected with the friction clutch via a release bearing as an actuating force transmission member, the release bearing being pre-stressed in the disengaging direction by a pre-load spring.

6. A device according to claim 5, wherein the slave cylinder is in the form of a central disengaging device.

7. A device according to claim 6, wherein the pre-load spring is formed as a compression spring, preferably a coil compression spring, and has one end which is supported at the release bearing and has another end which is supported at a housing of the central disengaging device, the sensor being arranged in a flux of force between the pre-load spring and the housing of the central disengaging device.

8. A device according to claim 7, wherein a spring plate is provided at the housing-side end of the pre-load spring, via which spring plate the pre-load spring is supported at the housing of the central disengaging device, the sensor being arranged at the spring plate.

9. A device according to claim 8, wherein the spring plate has a fixing section in which the sensor is received.

10. A device according to claim 9, wherein an evaluation electronics circuit for the sensor is also received in the fixing section of the spring plate.

11. A device according to claim 8, wherein the spring plate, with the aid of three bearing sections, abuts in statically determined fashion on a plane surface of the housing of the central disengaging device, the sensor having an actuating section which forms one of the three bearing sections.

12. A device according to claim 7, wherein the pre-load spring is supported at three points on a plane surface of the housing of the central disengaging device, wherein an actuating section of the sensor placed on the housing-side end of the pre-load spring forms a bearing section, whilst two further bearing sections are formed by deflections of a last housing-side turn of the pre-load spring, which deflections extend in a direction towards the plane surface of the housing.

13. A device according to claim 7, wherein the housing of the central disengaging device has a hole in which the sensor is arranged, a final section of the pre-load spring extending in a direction towards the hole, engages in the hole and abuts the sensor with an actuating effect.

14. A device for the optional disengaging and engaging, respectively, of a friction clutch for motor vehicles, with an actuating mechanism, the clutch having an engaging state and a disengaging direction and the actuating mechanism being operatively connected with the friction clutch via at least one actuating force transmission member for applying an actuating force, the actuating force transmission member being pre-stressed in the disengaging direction by means of a spring, and there being a sensor device for sensing a variable representative of at least one of the group consisting of the disengaging and engaging state, respectively, of the friction clutch and of the state of wear on the friction clutch with a sensor; wherein by means of the sensor the force of a spring arranged in parallel with the spring for pre-stressing the actuating force transmission member can be sensed as the variable representative of at least one of the group consisting of the disengaging and engaging state, respectively, of the friction clutch and of the state of wear on the friction clutch; and wherein the sensor is arranged in series with the spring which is arranged in parallel with the spring for pre-stressing the actuating force transmission member.

15. A device according to claim 14, wherein the sensor is an electric pressure sensor.

16. A device according to claim 15, wherein the electric pressure sensor has a piezoelectric element.

17. A device according to claim 14, wherein the sensor is arranged on a side of the spring arranged in parallel with the spring for pre-stressing the actuating force transmission member, which side faces away from the actuating force transmission member.

18. A device according to claim 14, wherein the actuating mechanism is a slave cylinder of a hydraulic clutch control, which, for applying an actuating force, is operatively connected with the friction clutch via a release bearing as an actuating force transmission member, the release bearing being pre-stressed in the disengaging direction by a pre-load spring.

19. A device according to claim 18, wherein the slave cylinder is in the form of a central disengaging device.

20. A device according to claim 14, wherein the spring arranged in parallel to the spring for pre-stressing the actuating force transmission member is a tension spring.

21. A device for the optional disengaging and engaging, respectively, of a friction clutch for motor vehicles, with an actuating mechanism in the form of a central disengaging device as a slave cylinder of a hydraulic clutch control, the clutch having an engaging state and a disengaging direction and the central disengaging device being operatively connected with the friction clutch via at least one actuating force transmission member in the form of a release bearing for applying an actuating force, the release bearing being pre-stressed in the disengaging direction by means of a pre-load spring, and there being a sensor device for sensing a variable representative of at least one of the group consisting of the disengaging and engaging state, respectively, of the friction clutch and of the state of wear on the friction clutch with a sensor; wherein by means of the sensor the force of the pre-load spring can be sensed as the variable representative of at least one of the group consisting of the disengaging and engaging state, respectively, of the friction clutch and of the state of wear on the friction clutch;

wherein the pre-load spring is formed as a compression spring, preferably a coil compression spring, and has one end which is supported at the release bearing and has another end which is supported at a housing of the central disengaging device, the sensor being arranged in a flux of force between the pre-load spring and the housing of the central disengaging device; and wherein a spring plate is provided at the housing-side end of the pre-load spring, via which spring plate the pre-load spring is supported at the housing of the central disengaging device, the sensor being arranged at the spring plate.

22. A device according to claim 21, wherein the spring plate has a fixing section in which the sensor is received.

23. A device according to claim 22, wherein an evaluation electronics circuit for the sensor is also received in the fixing section of the spring plate.

24. A device according to claim 21, wherein the spring plate, with the aid of three bearing sections, abuts in statically determined fashion on a plane surface of the housing of the central disengaging device, the sensor having an actuating section which forms one of the three bearing sections.

25. A device according to claim 21, wherein the sensor is an electric pressure sensor.

26. A device according to claim 25, wherein the electric pressure sensor has a piezoelectric element.

27. A device for the optional disengaging and engaging, respectively, of a friction clutch for motor vehicles, with an actuating mechanism in the form of a central disengaging device as a slave cylinder of a hydraulic clutch control, the clutch having an engaging state and a disengaging direction and the central disengaging device being operatively connected with the friction clutch via at least one actuating force transmission member in the form of a release bearing for applying an actuating force, the release bearing being pre-stressed in the disengaging direction by means of a pre-load spring, and there being a sensor device for sensing a variable representative of at least one of the group consisting of the disengaging and engaging state, respectively, of the friction clutch and of the state of wear on the friction clutch with a sensor; wherein by means of the sensor the force of the pre-load spring can be sensed as the variable representative of at least one of the group consisting of the disengaging and engaging state, respectively, of the friction clutch and of the state of wear on the friction clutch;

wherein the pre-load spring is formed as a compression spring, preferably a coil compression spring, and has one end which is supported at the release bearing and has another end which is supported at a housing of the central disengaging device, the sensor being arranged in a flux of force between the pre-load spring and the housing of the central disengaging device; and wherein the pre-load spring is supported at three points on a plane surface of the housing of the central disengaging device, wherein an actuating section of the sensor placed on the housing-side end of the pre-load spring forms a bearing section, whilst two further bearing sections are formed by deflections of a last housing-side turn of the pre-load spring, which deflections extend in a direction towards the plane surface of the housing.

28. A device according to claim 27, wherein the sensor is an electric pressure sensor.

29. A device according to claim 28, wherein the electric pressure sensor has a piezoelectric element.

30. A device for the optional disengaging and engaging, respectively, of a friction clutch for motor vehicles, with an actuating mechanism in the form of a central disengaging device as a slave cylinder of a hydraulic clutch control, the clutch having an engaging state and a disengaging direction and the central disengaging device being operatively connected with the friction clutch via at least one actuating force transmission member in the form of a release bearing for applying an actuating force, the release bearing being pre-stressed in the disengaging direction by means of a pre-load spring, and there being a sensor device for sensing a variable representative of at least one of the group consisting of the disengaging and engaging state, respectively, of the friction clutch and of the state of wear on the friction clutch with a sensor; wherein by means of the sensor the force of the pre-load spring can be sensed as the variable representative of at least one of the group consisting of the disengaging and engaging state, respectively, of the friction clutch and of the state of wear on the friction clutch;

wherein the pre-load spring is formed as a compression spring, preferably a coil compression spring, and has one end which is supported at the release bearing and has another end which is supported at a housing of the central disengaging device, the sensor being arranged in a flux of force between the pre-load spring and the housing of the central disengaging device; and wherein the housing of the central disengaging device has a hole in which the sensor is arranged, a final section of the pre-load spring extending in a direction towards the hole, engages in the hole and abuts the sensor with an actuating effect.

31. A device according to claim 30, in the sensor is an electric pressure sensor.

32. A device according to claim 31, wherein the electric pressure sensor has a piezoelectric element.

* * * * *